United States Patent
Lyberg

[11] Patent Number: 5,806,033
[45] Date of Patent: Sep. 8, 1998

[54] SYLLABLE DURATION AND PITCH VARIATION TO DETERMINE ACCENTS AND STRESSES FOR SPEECH RECOGNITION

[75] Inventor: Bertil Lyberg, Vagnharad, Sweden

[73] Assignee: Telia AB, Farsta, Sweden

[21] Appl. No.: 665,728

[22] Filed: Jun. 17, 1996

[30] Foreign Application Priority Data

Jun. 16, 1995 [SE] Sweden ................. 9502202

[51] Int. Cl.[6] .................................. G10L 5/00
[52] U.S. Cl. ............... 704/255; 704/211; 704/236; 704/257; 704/277
[58] Field of Search ................. 395/2.64, 2.45, 395/2.86, 2.66, 2.63, 2.6, 2.44, 2.5, 2.59, 2.62, 2.23, 2.2; 704/231, 200

[56] References Cited

U.S. PATENT DOCUMENTS

| | | | |
|---|---|---|---|
| 4,441,202 | 4/1984 | Tong et al. | 381/68 |
| 5,546,500 | 8/1996 | Lyberg | 395/2.86 |

FOREIGN PATENT DOCUMENTS

| | | |
|---|---|---|
| 0 527 650 | 2/1993 | European Pat. Off. . |
| 9303623-4 | 5/1995 | Sweden . |

*Primary Examiner*—David R. Hudspeth
*Assistant Examiner*—Donald L. Storm
*Attorney, Agent, or Firm*—Oblon, Spivak, McClelland, Maier & Neustadt, P.C.

[57] ABSTRACT

A method and device for speech-to-text conversion. From a given speech, the fundamental tone is extracted. A model of the speech is further created from the speech. In the model, a duration reproduction in words and sentences is obtained. The duration reproduction is compared with a segment duration in the speech. Information which decides which type of accent exists is obtained from the comparison from which a text with sentence accent information is produced. Further, in creating the model lexical information, which may indicate accents in words, can be utilized. Syntax analysis of the model can further by utilized to model a fundamental tone in a sentence. Such operations allow the re-recognition utilizing the accent and stress after a decision as to the type of accent which exists.

24 Claims, 1 Drawing Sheet

SYLLABLE DURATION AND PITCH VARIATION TO DETERMINE ACCENTS AND STRESSES FOR SPEECH RECOGNITION

BACKGROUND OF THE INVENTION

1. Technical Field

The present invention relates to speech-to-text-conversion. Especially the invention relates to the possibility to analyse a given speech, and, from this, obtain information about different accents as well as stressed and unstressed syllables in a speech. This information is of importance in interpretation of the given speech.

2. Prior Art

In the speech recognition systems which are utilized at present, with for instance HMM, fundamental tone and duration information are regarded as disturbances. Information regarding sentence accent types, respective stressed or unstressed syllables have, in the known applications, been performed on the basis of statistical methods. The information which is obtained via the accentuation in the speech has not been identifiable.

Patent document U.S. Pat. No. 5,220,639 describes a speech recognition for mandarine chinese characters. A sequence of single syllables is recognized by separate recognition of syllables and mandarine tones and recognized parts are put together for recognition of the single syllable under utilization of hidden Markov models. The recognized single syllable is used by a Markov chinese language model in a linguistic decoder section for determination of a corresponding chinese character. A tone pitch frequency detector is utilized. The tone pitch frequency detector detects characteristics regarding the pitch frequency of the unknown signal and transmits it to a detector for tone recognition e.g., a personal computer, in which Markov model probabilities for the five different tones are calculated.

Patent document U.S. Pat. No. 4,852,170 describes language translation under utilization of speech recognition and synthesis. Each speech segment is logically analysed for identification of phoneme class affiliation. After that the frequency spectrum of the segment is analysed for identification of specific phonemes within the type.

Patent document U.S. Pat. No. 4,489,433 describes a speech information transmission by means of telex equipment. After the transmission, speech data can be converted into a readable message of characters. The technology according to the document is principally intended to be applied to the Japanese language. The accent type of Japanese words is a tone pitch accent and can be identified depending on the position of the point of time between the syllables at which the tone pitch frequency is changed abruptly to a low frequency. The word accent code indicates a sudden change in tone pitch and fundamental tone frequency, usually caused by the accent of a special syllable in a word.

Patent document U.S. Pat. No. 4,178,472 deals with a speech instruction identification system which suggests commands by examination of a pattern of changes in syllable sounds. The fundamental tone frequency is used as a symbolic value for speech/sound.

Patent document EP 180047 relates to recognition of spoken text and following printing. For each segment of the recognized spoken text a corresponding string of characters is stored. Lexical information is utilized.

DESCRIPTION OF THE INVENTION

TECHNICAL PROBLEM

In speech recognition there is a need to identify different sentence accents and respective stressed and unstressed syllables in words and sentences. Methods or devices to generally appoint different types of accent to respective stressed/unstressed syllables have so far been lacking. The prosodic information has so far not been used in speech recognition but is regarded as a disturbance in the statistical methods which are used. The prosodic information is necessary in advanced speech understanding systems in speech-to-speech translation. By analysing the prosodic information and appointing the location of the accents and the types of the accents in words and sentences an increased understanding of the given speech is obtained along with a possibility to translate the speech better between different languages. Problems still exist to appoint stressed/unstressed syllables in words and sentences. By providing the ability to identify the location of respective stressed and unstressed syllables in words and sentences, the possibility to identify the real meaning of a sentence is increased. Consequently there exists a need to identify said parameters and utilize these in connection with speech recognition.

The aim of the present invention is to provide a method and device for identification of the proper sense of a given speech.

THE SOLUTION

The present invention relates to a method at speech-to-text conversion where the fundamental tone is extracted from a speech. From the speech is created a model of the speech. From the model is obtained a duration reproduction in words and sentences. The duration reproduction is compared with a segment duration in the speech. From the comparison is decided which type of accent that exists and a text with sentence accent information is produced. Sentence accents of type 1 and 2 are discernible. Further, stressed and unstressed syllables are discernible. From the model a model is modelled of the fundamental tone in words and sentences. The invention further indicates that the fundamental tone is compared with the modelled fundamental tone, at which indication for possible accents is obtained. The possible accents at the comparison of the fundamental tone and the comparison of duration are compared, and decision is made which type of accent or stressed/unstressed syllable that exists. The decision is utilized to adjust the model. A text is at that produced which with great probability obtains one with the speech corresponding meaning. At the creation of the model lexical information is utilized. The lexical information indicates alternative accents in the words. The lexical information further indicates alternative durations for different segments in the words which are recognized. Syntax analysis of the model is utilized at modelling of the fundamental tone in the sentence. The syntax analysis of the model is utilized at the modelling of the sentences.

The invention further relates to a device at speech-to-text conversion. A fundamental tone is extracted from a speech in a speech recognition equipment. A model of the speech is created in the speech recognition equipment. From the model a duration reproduction in words and sentences is created. The device further is arranged to compare the duration reproduction with a segment duration in the speech. Decision regarding type of accent is performed in the device on the basis of the comparison. A text with sentence accent information is produced. Sentence accents of type 1 and 2 are discernible, as well as stressed and unstressed syllables. From the model a model of the fundamental tone in words and sentences is produced. The extracted fundamental tone is compared with the modelled fundamental tone and an indication of possible locations of accents is obtained. The possible accents at the fundamental tone comparison are compared and decision is made regarding which type of accent or stressed/unstressed syllables that exist. The decision is utilized for correction of the model, and a text is produced which with great probability corresponds with the meaning of the speech. Lexical information is utilized at the creation of the model. In the lexical information is included information about different types of accents respective stressed/unstressed syllables etc. in different words and sentences. By means of the lexical information alternative accents and accent locations are obtained in the words which have been obtained from the lexical information. Alternative durations for different segments in the recognized words are obtained from the lexical information. At modelling of the fundamental tone in sentences, a syntax analysis of the model is utilized. At modelling of the sentences the syntax analysis of the model is utilized.

ADVANTAGES

The invention allows that a prosodic information is utilized at speech analysis, at which an increased understanding of the speech is obtained. The increased understanding will increase the possibility to utilize spoken information in different connections, for instance translation from a speech into another speech at automatic speech translation. The invention further allows an increased possibility to utilize spoken information in different connections for control of different services in a telecommunications network, at control of different devices, computers etc.

DETAILED EMBODIMENT

Figure 1:
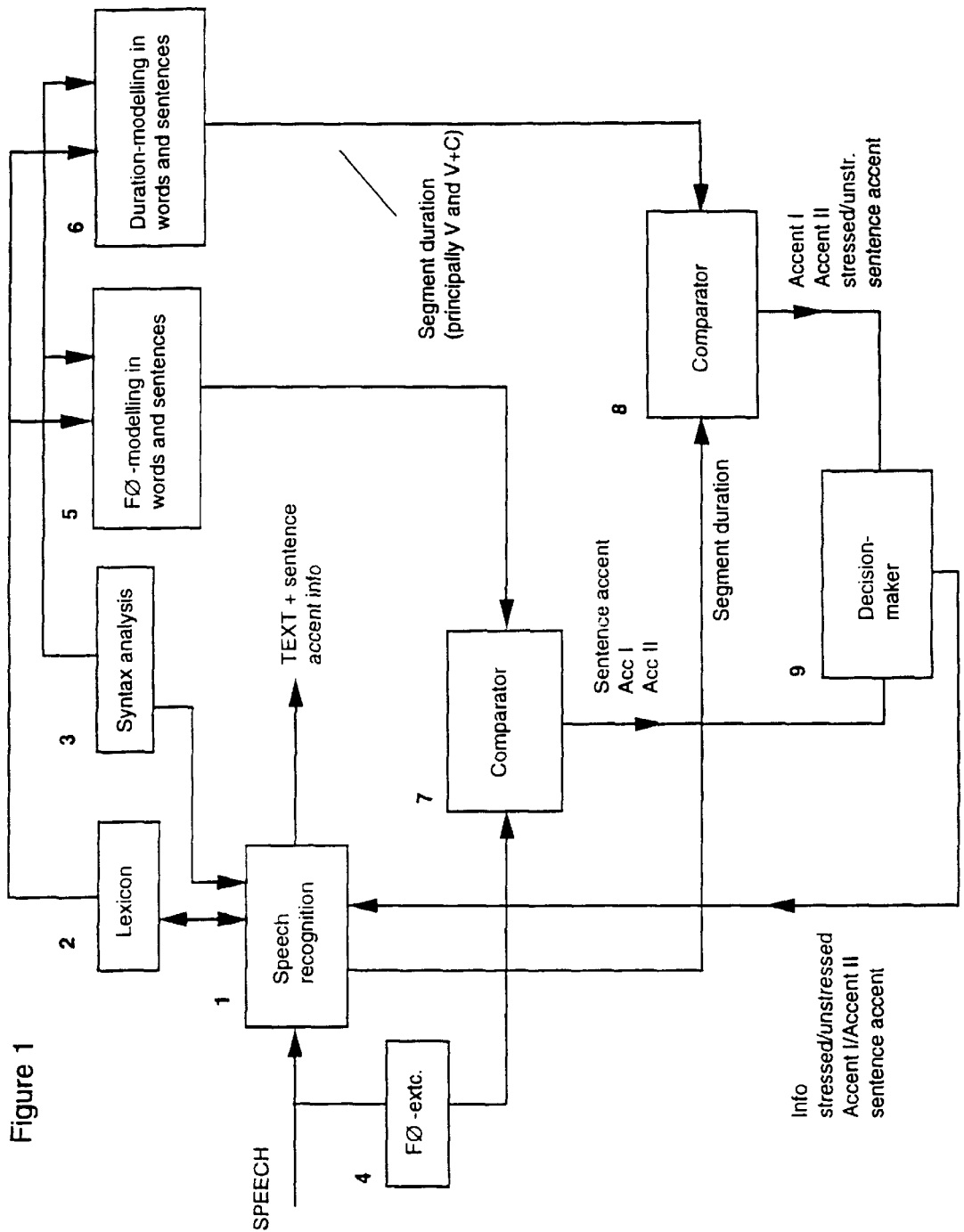
FIG. 1 shows the invention in the form of a block diagram.

In the following the invention is described on the basis of the figures and the terms therein.

A produced speech is fed into a speech recognition equipment, 1. In the speech recognition equipment the speech is analysed in its components. At this different recognized sequences appear, which are made up to words and sentences. The analysis which is performed in the speech recognition equipment is performed with for the professional in the field wellknown technology. Consequently, for instance Hidden Markov Models, HMM, can be utilized. In this type of analysis the fundamental tone and the duration information are regarded as disturbances. Information regarding the duration of the segments is however possible to derive in the Markov model. By the analysis in the speech recognition equipment are obtained a number of recognized sounds which are put together to words and sentences. One consequently obtains a set of combinations of syllables which are possible to combine to different words. Said words consist of words which exist in the language, respective words which do not exist in the language. In a first check of the recognized words, possible combinations are transferred to a lexicon, 2. The lexicon consists of a normal lexicon with pronounciation and stress information. In the lexicon different possible words are checked, which can be created from the recognized speech segments. From the lexicon information, information about the possible words which can exist based on the recognized speech is fed back. In the speech recognition equipment after that a compilation of the words is made to clauses and sentences. This information is transferred to a syntax analysis, 3. In the syntax analysis is checked whether the suggestions to clauses and sentences which have occured are, from a linguistic point of view acceptable or not acceptable in the language. The lexical and syntactical information is after that transferred to a fundamental tone modelling unit.5, and a duration modelling unit, 6. In the fundamental tone modelling unit the fundamental tone is modelled on the basis of the lexical and syntactical information. At that a fundamental tone modelling in words and sentences is obtained. The obtained information is transferred to a comparator, 7, which also obtains an information regarding the fundamental tone of the speech which has been extracted i the fundamental tone extractor, 4. At the comparison in 7 information about possible locations of the sentence accent, accent 1 and accent 2 is obtained.

From the lexical and syntactical analysis a model of the duration in words and sentences is also produced. At that the lexicon contains information about the duration of different syllables in the possible words which have been obtained at the analysis of the speech. In syntax analyses also possible durations for different parts in the sentences which are possible and in the different words are produced. From the total information a segment duration, where the duration of the vowels and possibly following consonants are the most important, is obtained. The in this way obtained information is transferred to a second comparator, 8. The comparator, 8, also obtains an information segment duration in the real speech from the speech recognition equipment. At the comparison in the comparator, 8, information about possible locations for accent 1, accent 2, stressed or unstressed syllables and sentence accents is obtained. This information is transferred to a decision-maker, 9, which has also received information from the first comparator, 7, regarding sentence accent 1 and accent 2 from the fundamental tone information. The decision-maker after that compiles the information from the two comparators and decides whether accent 1, accent 2, stressed or unstressed syllable or sentence accent exists. The obtained information is after that fed back to the speech recognition equipment which modifies the original model and after that feeds out a text with sentence accent information.

By the suggested solution a possibility is given to recognize a speech and reproduce it in a correct way with better accuracy than in previously known methods. The in the original speech given meaning can at that be reproduced in a correct way. Further the information can be utilized in the case the given speech shall be translated into another language. Further possibility is given, in a correct way to find right word and expression and determine which of alternative meanings that shall be utilized at the analysis of words and sentences. The uncertainty at previous methods, principally statistical methods, to decide the proper sense of different words, is by the suggested method reduced in a drastical way.

The invention is not restricted to the in the description presented embodiment, or by the patent claims, but can be subject to modifications within the frame of the idea of invention.

I claim:

1. Method for speech-to-text-conversion by extracting a fundamental tone from speech, and creating a model of the speech from the speech, comprising the steps of:

obtaining from the model a duration reproduction in words and sentences, comparing the duration reproduction with a segment duration in the speech, deciding from the comparison which type of accent exists, and producing a text with sentence accent information from results of the deciding step.

2. Method according to claim 1, wherein the step of deciding comprises discerning a first accent, a second accent, and sentence accents.

3. Method according to claim 1, wherein the step of deciding comprises discerning stressed and unstressed syllables.

4. Method according to claim 1, wherein the step of creating a model comprises utilizing, at the creation of the model lexical information.

5. Method according to claim 4, wherein the lexical information indicates alternative accents in the words.

6. Method according to claim 4, wherein the lexical information indicates alternative durations for different segments in the words which are obtained from the model.

7. Method according to claim 1, wherein the step of obtaining comprises modeling a model of the fundamental tone in words and sentences.

8. Method according to claim 7, wherein the step of comparing comprises comparing an extracted fundamental tone with the modelled fundamental tone to obtain an indication of possible accents.

9. Method according to claim 8, wherein the step of comparing compares the possible accents at the fundamental tones and the duration, and
wherein the step of deciding decides which type of accent or stressed or unstressed syllable exists.

10. Method according to claim 9, further comprising the step of using the decision for correction of the model to produce text from which one gets the corresponding speech meaning of the speech.

11. Method according to claim 7, wherein syntax analysis of the model is utilized to model the fundamental tone in the sentence.

12. Method according to claim 11, wherein the syntax analysis of the model is utilized to model the sentences.

13. Device for speech-to-text conversion, from a fundamental tone extracted from speech in a speech recognition equipment, and from a model of the speech created in the speech recognition equipment, the device comprising:
means for creating a duration reproduction in words and sentences from the model,
a comparator for comparing a duration reproduction with a segment duration in the speech,
means for deciding an accent type based on a result of the comparator, and
means for producing a text with sentence accent information from results of the means for deciding.

14. Device for speech-to-text conversion according to claim 13, wherein the comparator comprises a comparator for discerning accent 1, accent 2, and sentence accents.

15. Device for speech-to-text conversion according to claim 13, wherein the comparator comprises a comparator for discerning stressed and unstressed syllables.

16. Device for speech-to-text conversion according to claim 13, wherein lexical information is utilized to create the model.

17. Device for speech-to-text conversion according to claim 16, further comprising means to obtain alternative accents in the words from the lexical information.

18. Device for speech-to-text conversion according to claim 16, further comprising means to obtain alternative durations for different segments in recognized words from the lexical information.

19. Device for speech-to-text conversion according to claim 13, further comprising a modeller for producing a model of the fundamental tone in words and sentences.

20. Device for speech-to-text conversion according to claim 19, wherein the comparator further comprises a comparator for comparing the extracted fundamental tone with the modelled fundamental tone to obtain an indication of possible locations of accents.

21. Device for speech-to-text conversion according to claim 13, wherein the comparator comprises a comparator for comparing possible accents of the fundamental tone; and
wherein the means for deciding comprises a means for deciding which type of accent or stressed/unstressed syllable exists.

22. Device for speech-to-text conversion according to claim 13, wherein during modelling of the fundamental tone, a syntax analysis of the model is utilized.

23. Device for speech-to-text conversion according to claim 13, wherein during modelling of the sentences, the syntax analysis of the model is utilized.

24. Device for speech-to-text conversion according to claim 13, further comprising a means for using a result from the means for deciding to correct the model and to produce text.

* * * * *